United States Patent [19]

Eilertsen

[11] Patent Number: 4,812,690

[45] Date of Patent: Mar. 14, 1989

[54] SOLENOID ACTUATORS

[75] Inventor: John L. Eilertsen, Birmingham, Mich.

[73] Assignee: G. & E. Engineering Ltd., Birmingham, Mich.

[21] Appl. No.: 11,499

[22] Filed: Feb. 5, 1987

Related U.S. Application Data

[63] Continuation of Ser. No. 589,727, Mar. 15, 1984, abandoned, which is a continuation-in-part of Ser. No. 323,239, Nov. 20, 1981, abandoned.

[51] Int. Cl.[4] .......................... H02K 33/12; H01F 7/08

[52] U.S. Cl. .......................... 310/27; 335/220; 310/191

[58] Field of Search .................. 310/268, 46, 191, 209, 310/201, 103, 27; 335/220

[56] References Cited

U.S. PATENT DOCUMENTS

| | | | |
|---|---|---|---|
| 2,438,629 | 3/1948 | Anderson | 310/268 X |
| 2,735,028 | 2/1956 | Brouwer | 310/191 X |
| 3,192,422 | 6/1965 | Kober | 310/191 |
| 3,509,390 | 4/1970 | Loughlin et al. | 310/268 X |
| 3,602,745 | 8/1971 | Davis | 310/13 |
| 3,700,943 | 10/1972 | Heintz et al. | 310/268 X |
| 3,700,944 | 10/1972 | Heintz | 310/268 X |
| 4,334,205 | 6/1982 | Seilly | 310/27 |

*Primary Examiner*—Patrick R. Salce
*Assistant Examiner*—Judson H. Jones
*Attorney, Agent, or Firm*—Barnes, Kisselle, Raisch Choate, Whittemore & Hulbert

[57] ABSTRACT

Solenoid actuators comprising an armature mounted along its planar edge by ball bearing elements within a stator frame assembly. The armature and stator frame include opposing grooves at the plane of the armature in which the ball bearing elements are captured. The stator comprises multiple pole pieces having conductive ribbon stock wound therearound for connection to a source of electrical power to move the armature on the ball bearing elements within the frame. Fixed axis, variable position linear actuators, variable axis linear actuators and rotary actuators are disclosed as preferred embodiments. Modified embodiments include a stator assembly wherein opposed stator poles are staggered laterally of the actuator centerline so as to be positioned between adjacent pairs of opposed poles. The armature may be flat or may comprise a juxtaposed spaced pair of armature plates which have internested undulations which project between adjacent pairs of the opposing stator poles.

37 Claims, 9 Drawing Sheets

SOLENOID ACTUATORS

This application is a continuation of application Ser. No. 589,727 filed Mar. 15, 1984 and now abandoned, which was a continuation-in-part of application Ser. No. 323,239 filed Nov. 20, 1981 and now abandoned.

The present invention is directed to electromagnetic solenoid actuators, and more particularly to improvements in both rotary and linear actuators having either fixed or variable axes.

Objects of the present invention are to provide improvements in construction of solenoid actuators of both rotary and linear types, and of both variable axis and fixed axis types, which achieve improved efficiency as compared with rotary and linear actuators characteristic of the prior art by minimizing inductance losses in the actuator structure, improving heat dissipation characteristics, and/or increasing the ampere-turn/ copper-mass ratio and thereby achieving a given power output using less copper material than in the prior art.

Another object of the invention is to provide rotary and linear actuators which achieve reduced size and cost for a given output power and stroke requirement as compared with prior art devices.

A further object of the invention is to provide improvements in rotary and linear actuators which achieve enhanced operating speed and efficiency as compared with the prior art by eliminating any requirement for electromagnetic flux reversals in the actuator stator and armature structures, and/or by reducing or eliminating parasitic eddy currents.

Yet another object of the invention is to provide variable axis solenoid actuators of either the rotary or linear type which achieve high power or torque output at the beginning of the armature stroke as is typically desirable for efficient operation of external devices, and/or substantially uniform output power during the remainder of the stroke.

The invention, together with additional objects, features and advantages thereof, will be best understood from the following description, the appended claims and the accompanying drawings in which:

Figure 1:
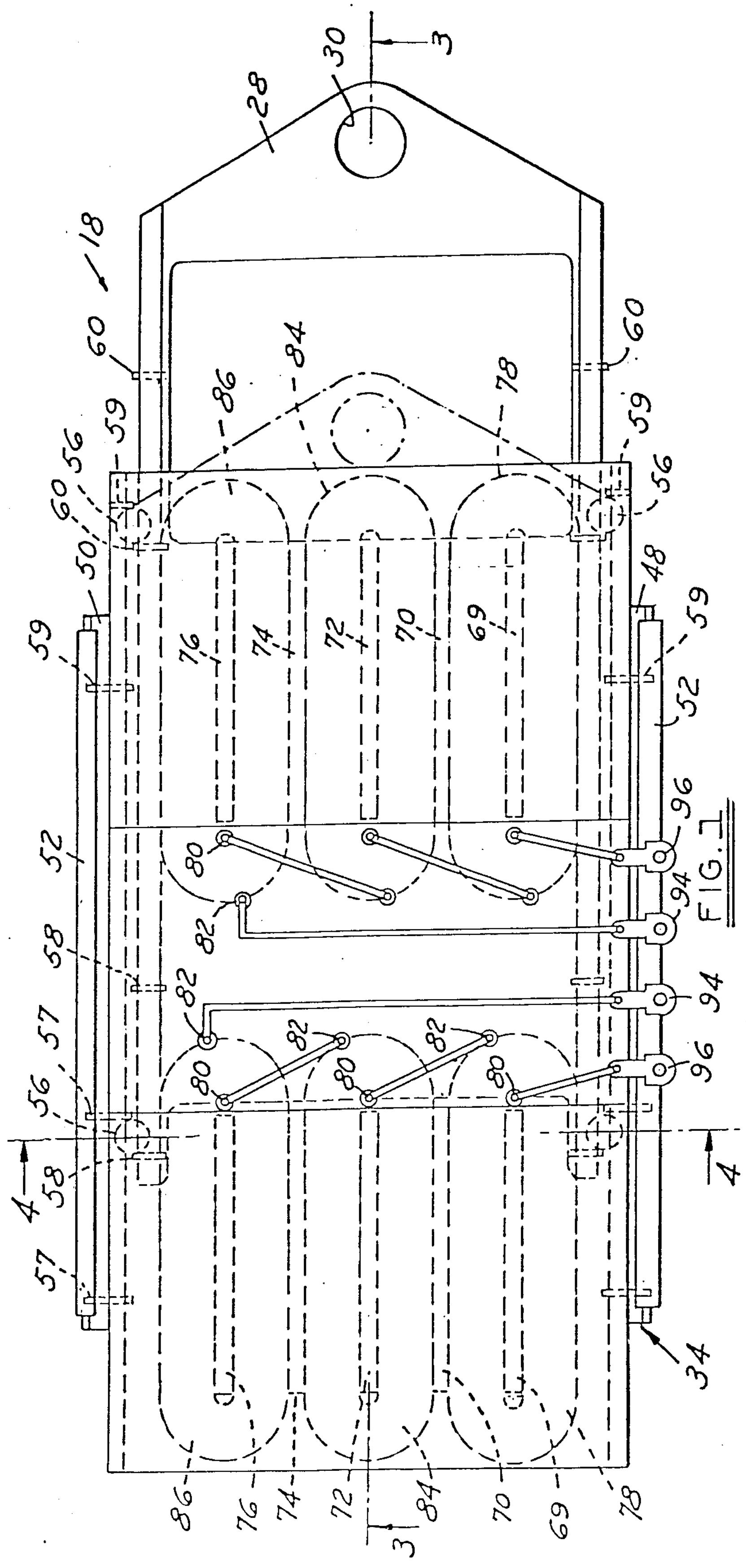
FIG. 1 is a top plan view of a fixed axis variable position linear actuator in accordance with one presently preferred embodiment of the invention.
Figure 2:
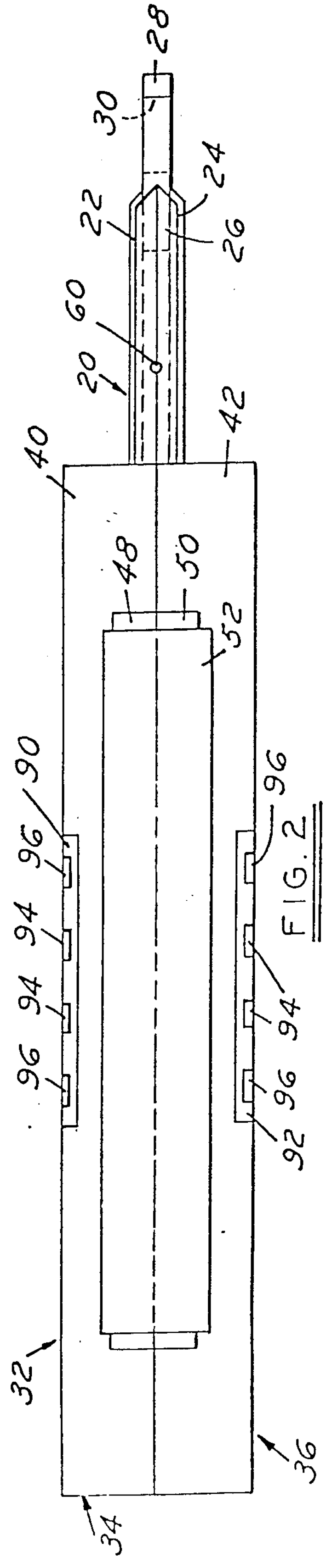
FIG. 2 is a side elevational view of the actuator in FIG. 1.
Figure 3:
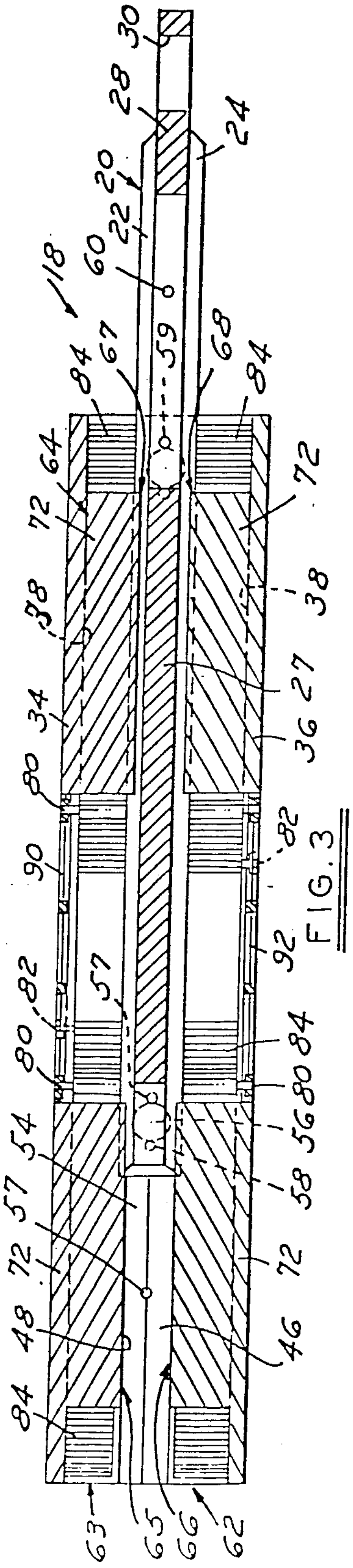
Figure 4:
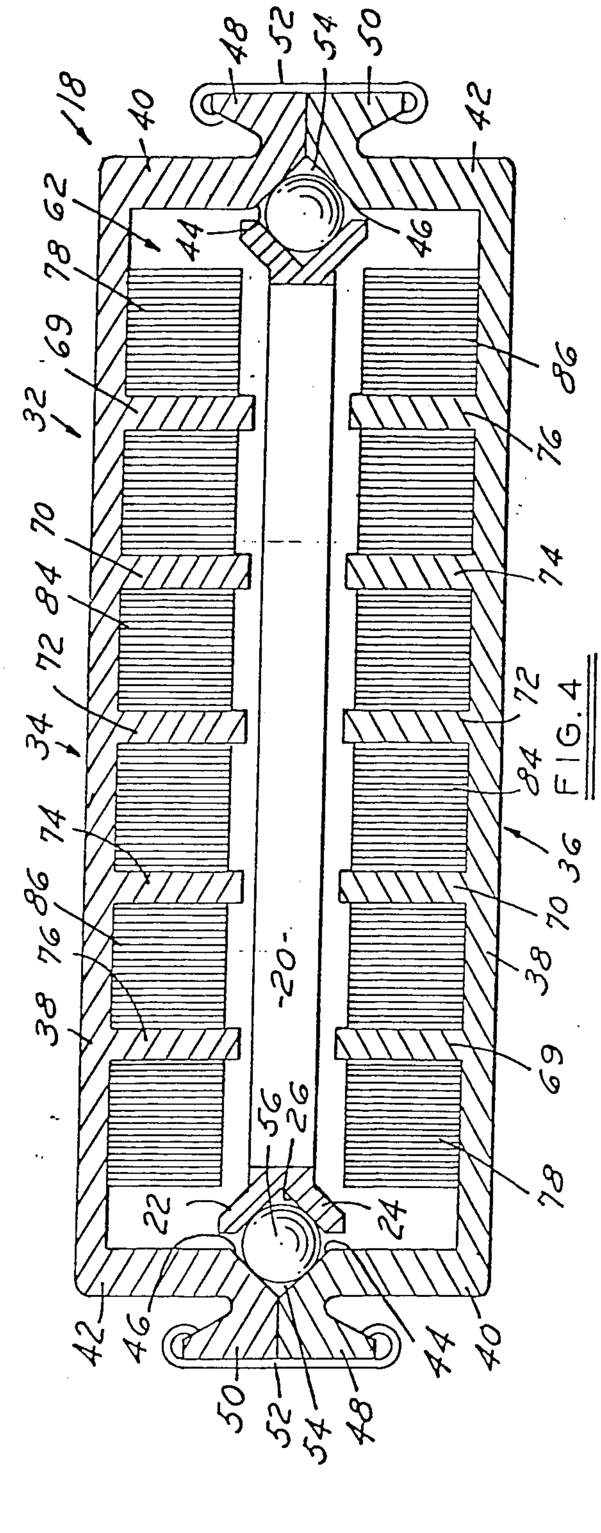
Figure 5:
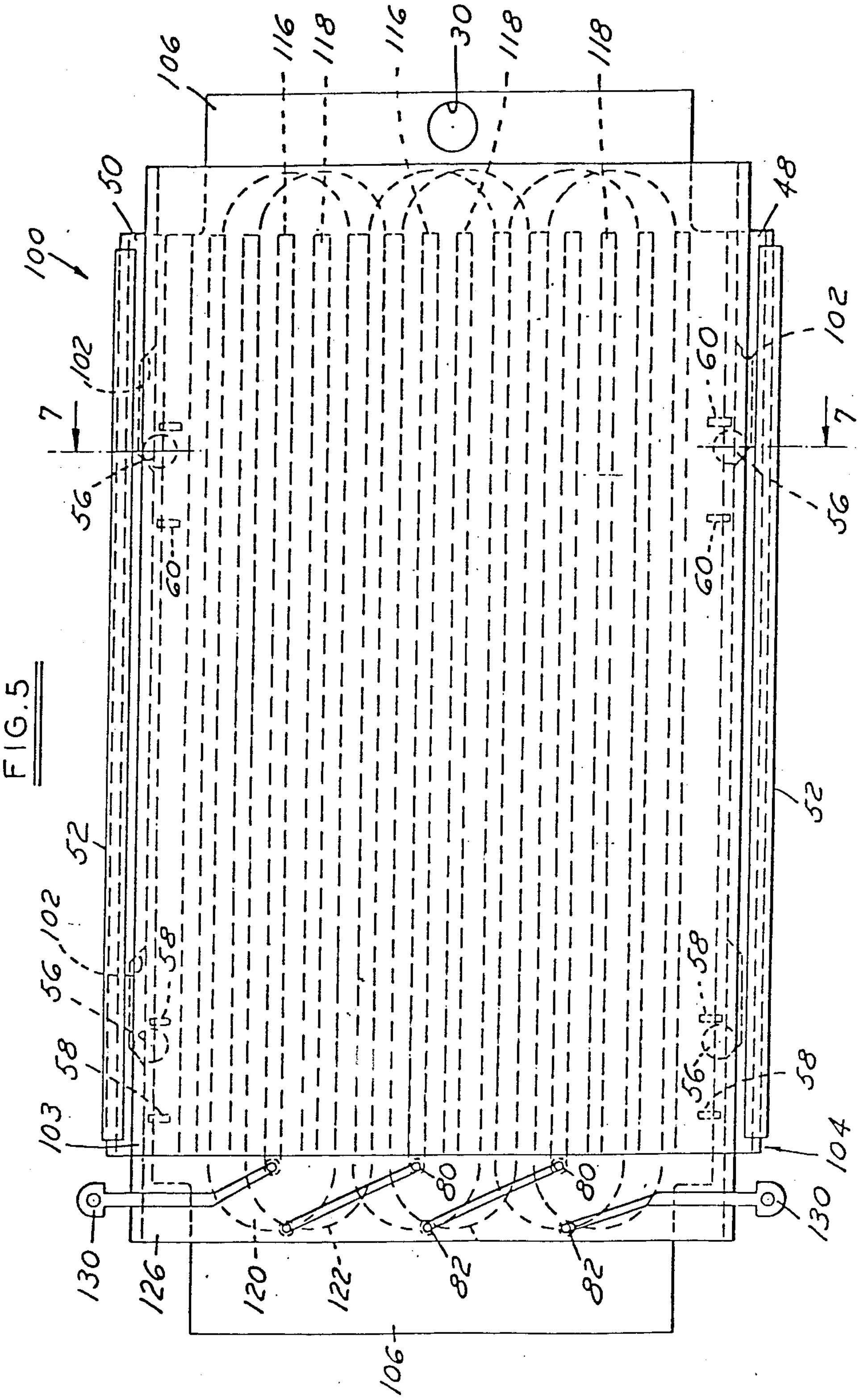
Figure 6:
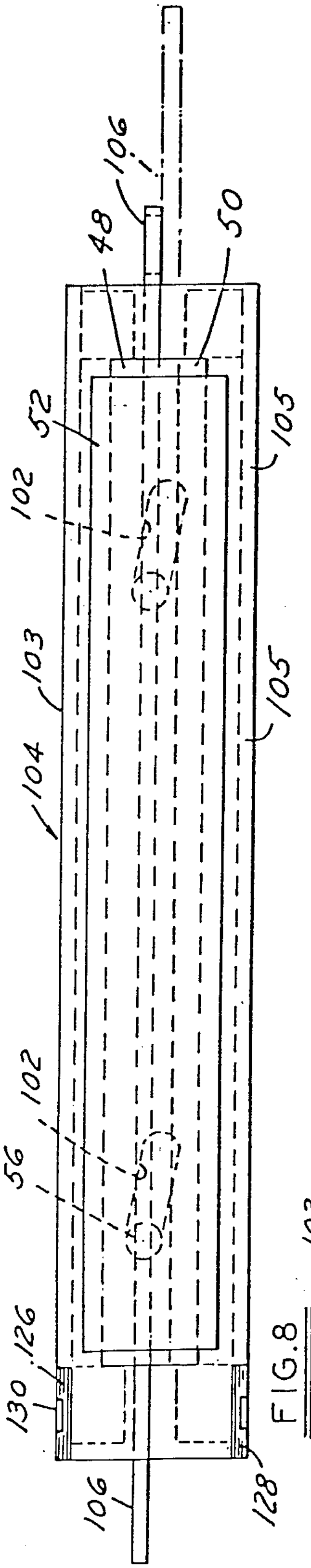
Figure 7:
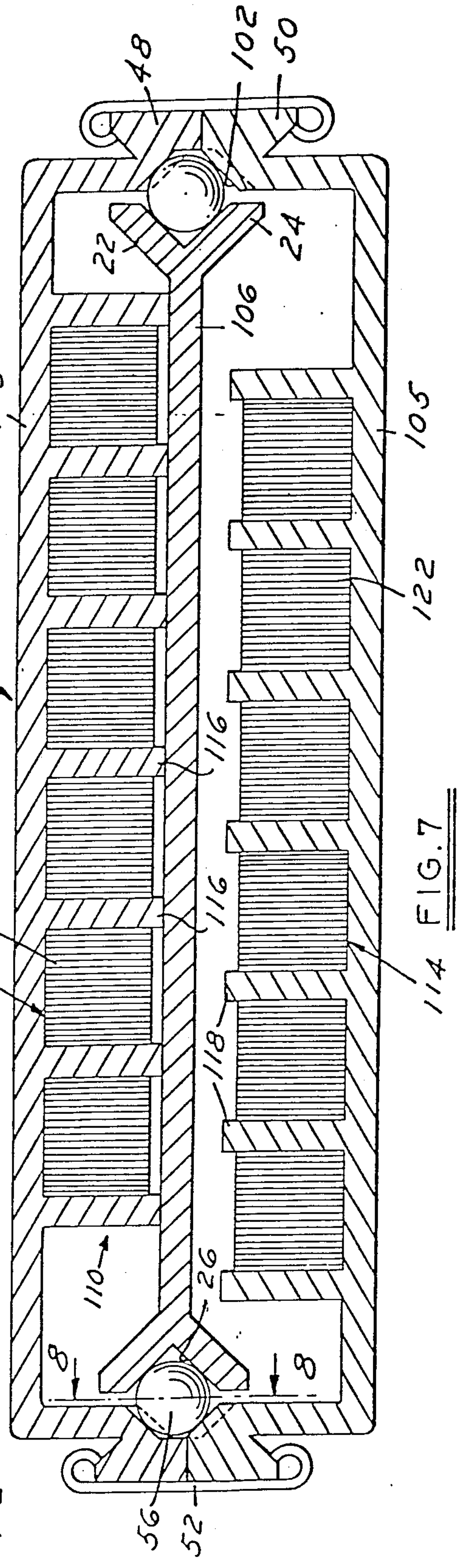
Figure 8:
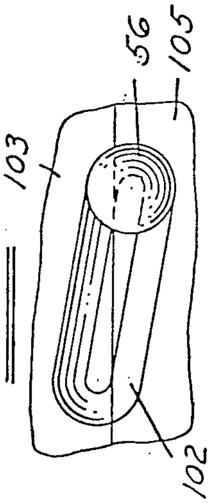
Figure 10:
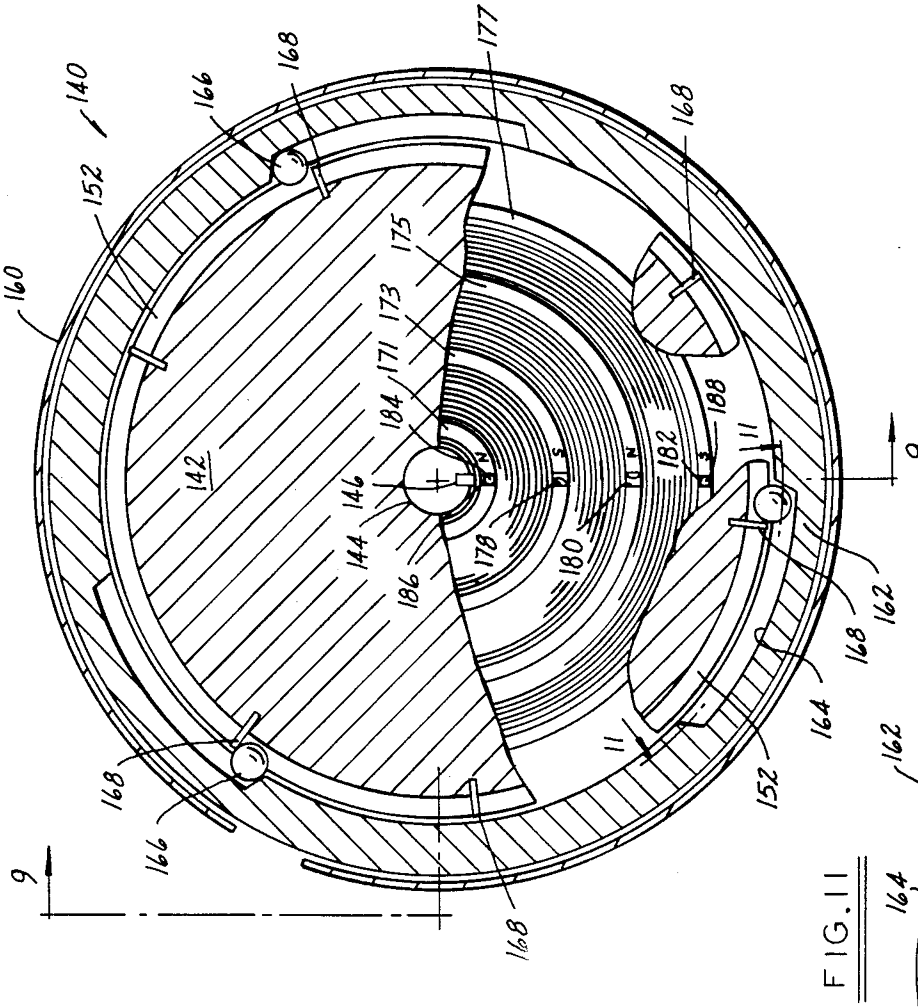
Figure 9:
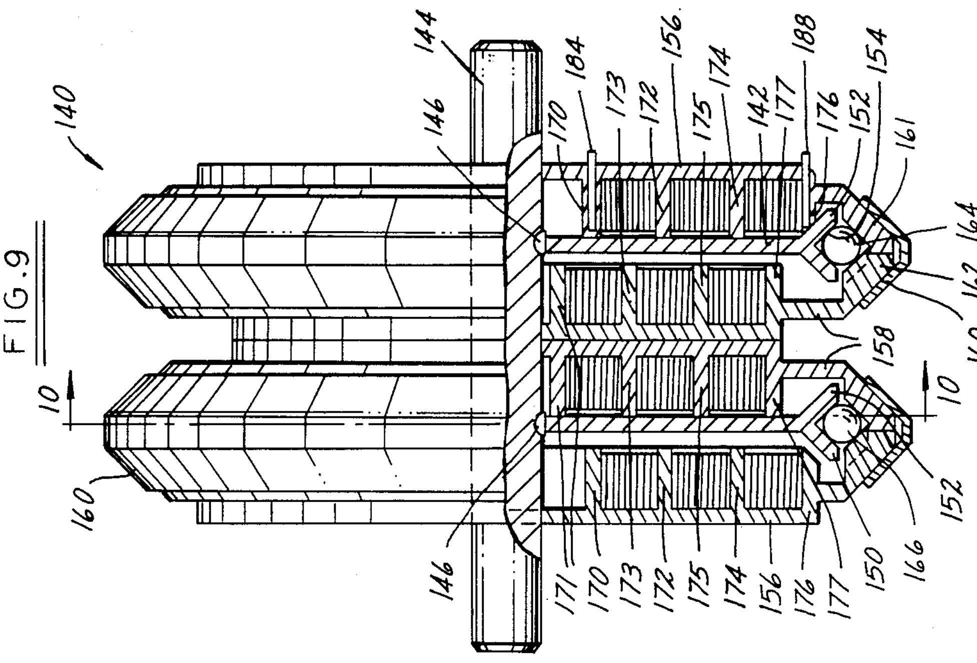
Figure 11:
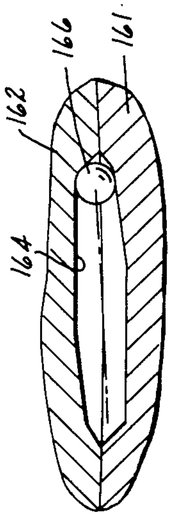
Figure 12:
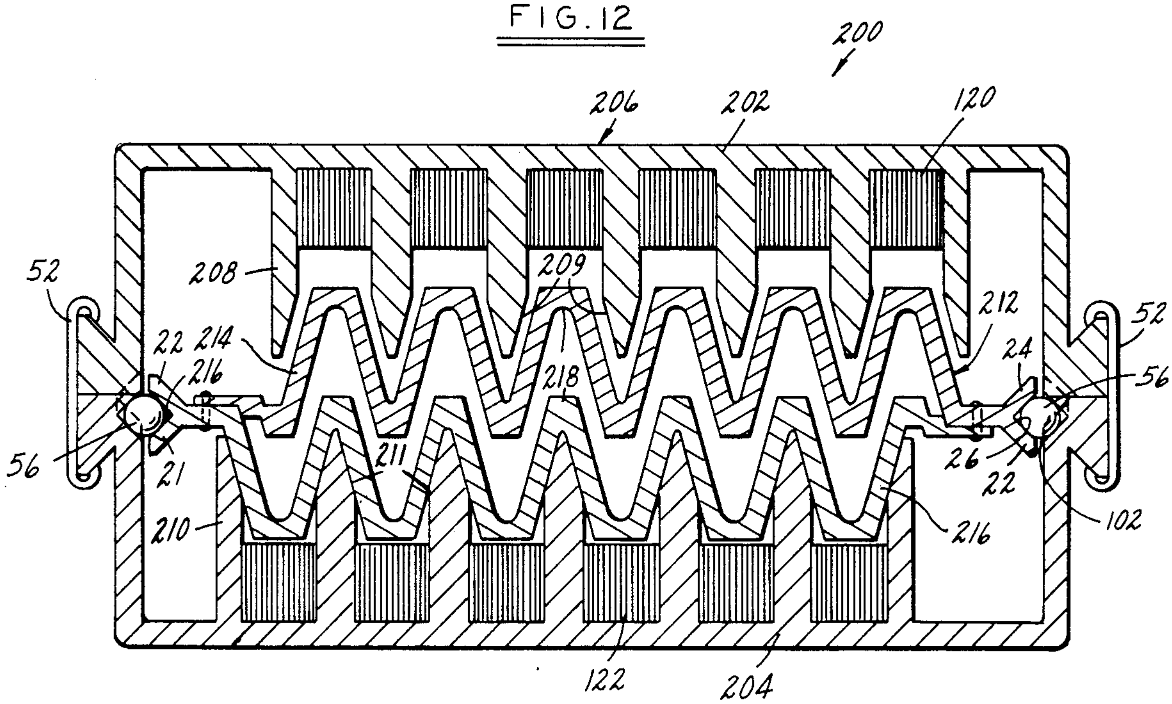
Figure 13:
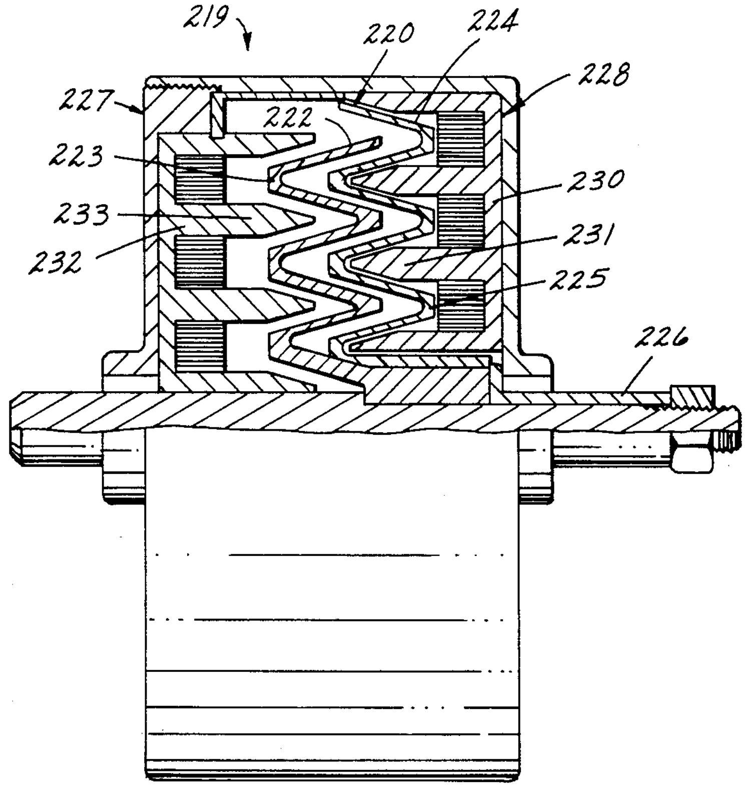
Figure 15:
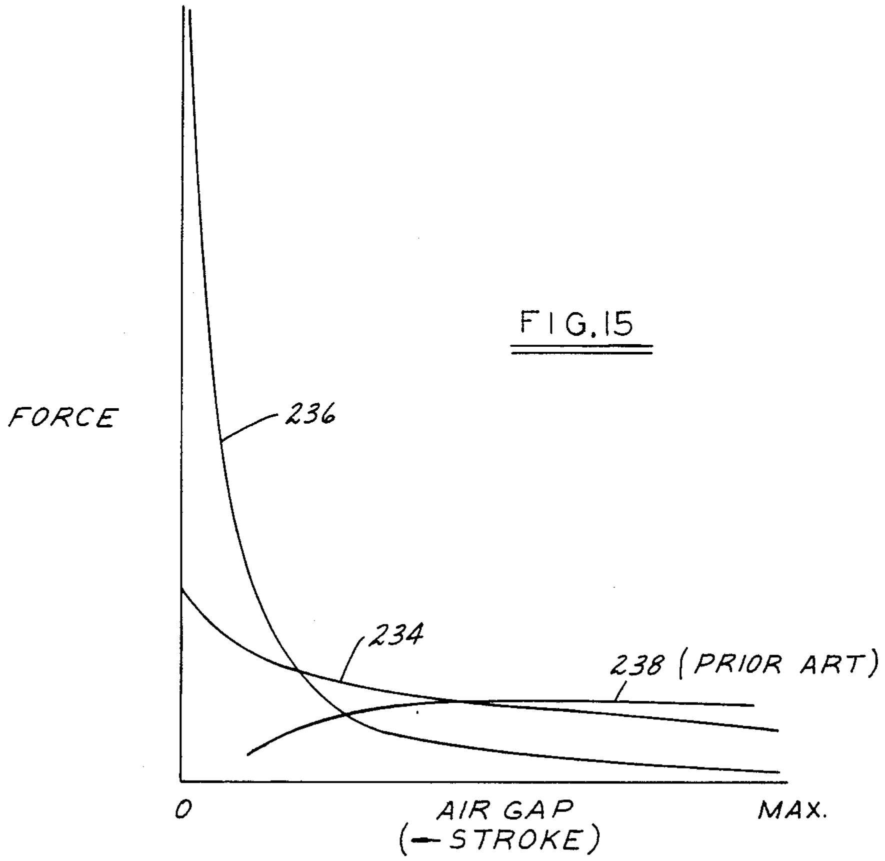
Figure 14:
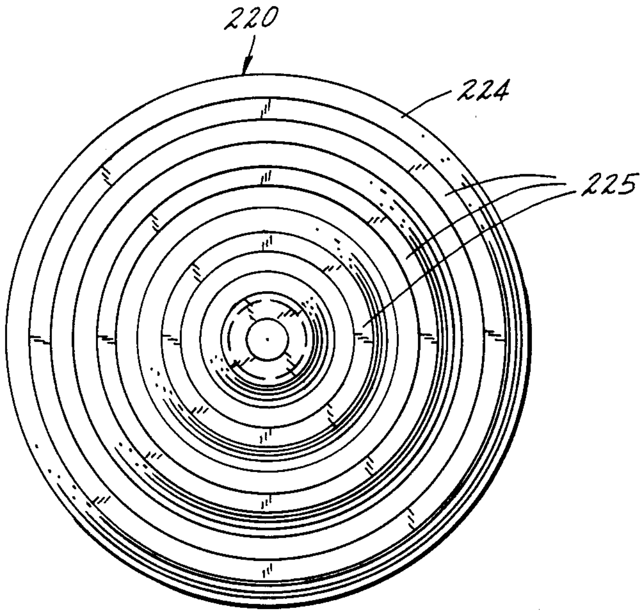
Figure 16:
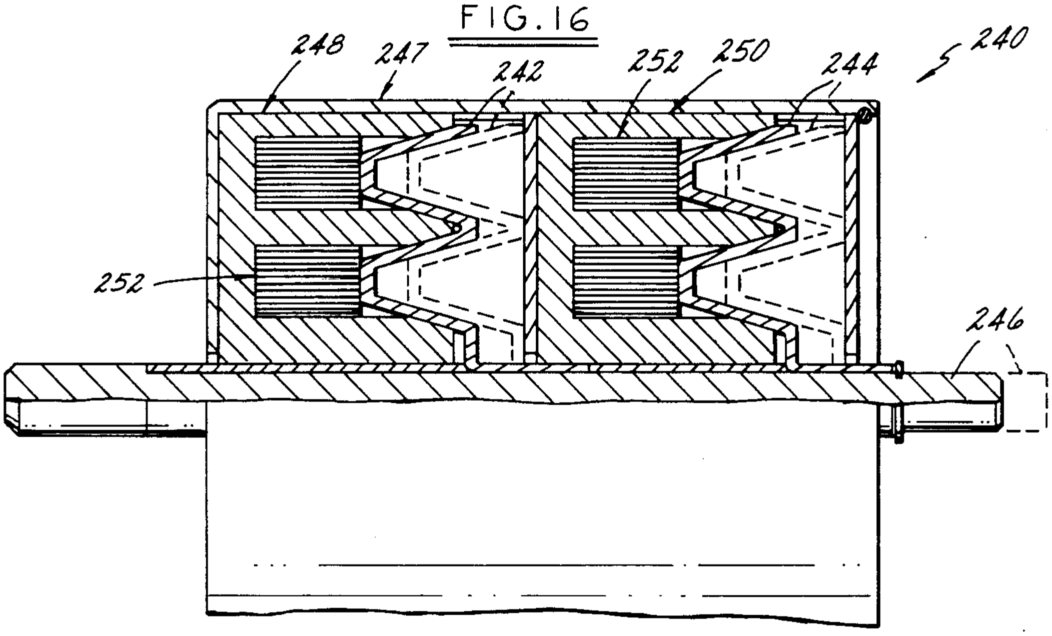
Figure 17:
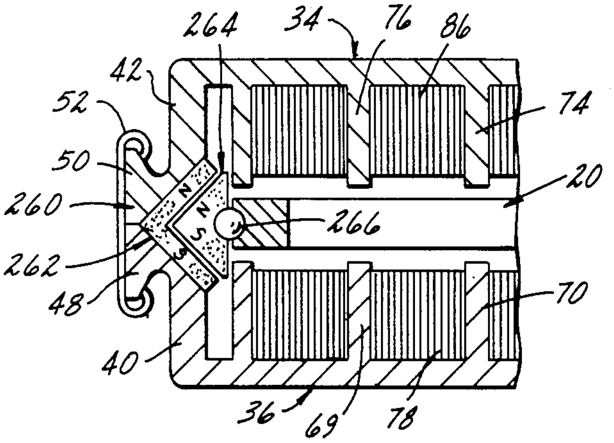
Figure 18:
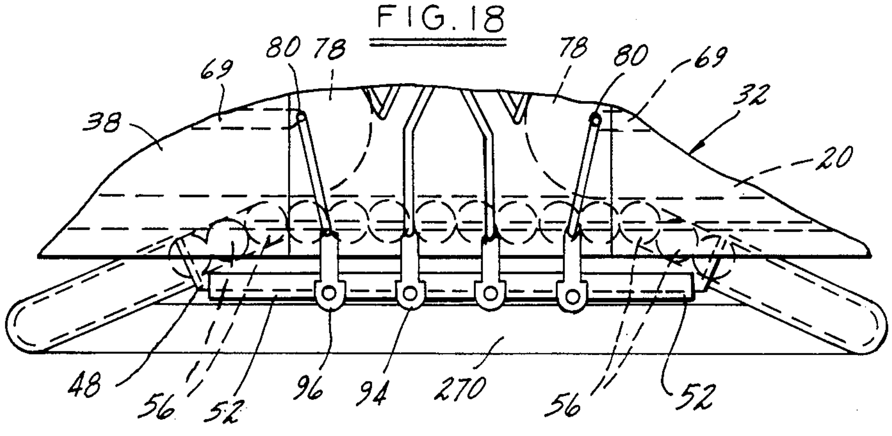
Figure 19:
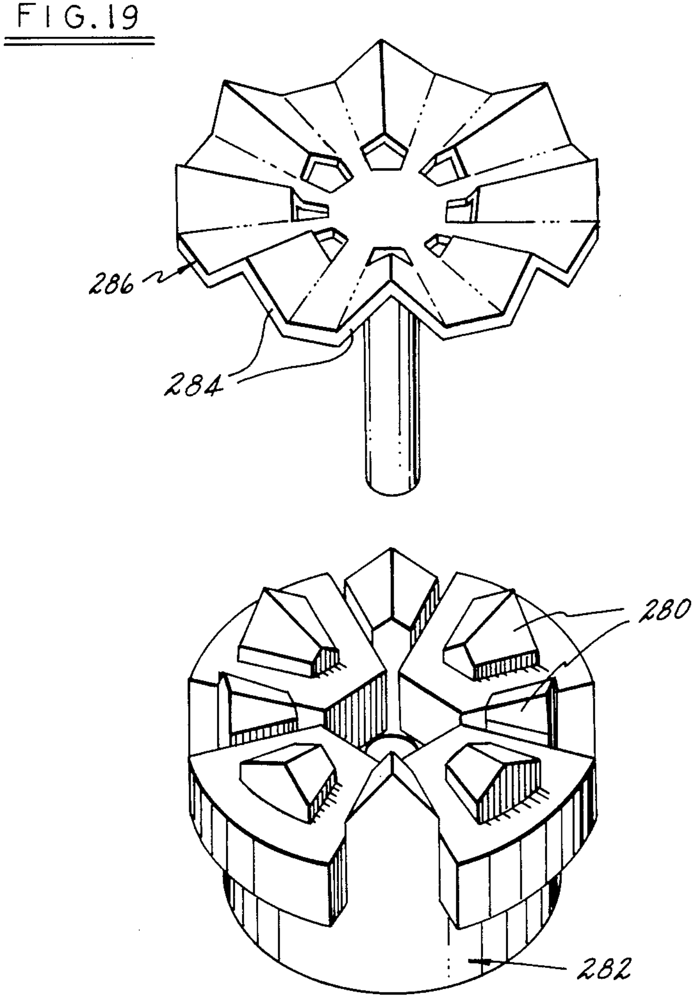

FIGS. 3 and 4 are sectional views taken along the respective lines 3—3 and 4—4 in FIG. 1;

FIG. 5 is a top plan view of a variable axis linear actuator in accordance with a second preferred embodiment of the invention;

FIG. 6 is a side elevational view of the actuator of FIG. 5;

FIGS. 7 and 8 are sectional views taken substantially along the lines 7—7, and 8—8 in FIGS. 5 and 7 respectively;

FIG. 9 is a side elevational view of a fixed axis rotary actuator in accordance with yet another presently preferred embodiment of the invention, FIG. 9 being partially sectioned as viewed along the line 9—9 in FIG. 10;

FIGS. 10 and 11 are sectional views taken substantially along the lines 10—10 and 11—11 in FIGS. 9 and 10 respectively;

FIG. 12 is a sectional view similar to that of FIG. 7 and showing, another modified embodiment of the invention;

FIG. 13 is a partially sectioned view similar to that of FIG. 9 showing a further embodiment of the invention;

FIG. 14 is an end elevational view of the armature of the solenoid actuator illustrated in FIG. 13;

FIG. 15 is a graphic illustration which compares operation of various embodiments of the invention to each other and to the prior art;

FIG. 16 is a fragmentary partially sectioned view similar to those of FIGS. 9 and 13 showing yet another embodiment of the invention;

FIG. 17 a fragmentary sectioned view similar to a portion of FIG. 4 showing a modification thereto;

FIG. 18 is a fragmentary plan view similar to a portion of FIG. 1 showing a modification thereto; and FIG. 19 is an exploded perspective view of another modified embodiment of the invention.

FIGS. 1–4 illustrate a first embodiment of the present invention as comprising a fixed axis, variable position linear actuator 18. Actuator 18 includes a planar generally rectangular armature 20 of magnetically permeable material. A pair of outwardly directed mutually orthogonal flanges 22,24 extend lineally along each laterally spaced side edge of planar armature 20 so as to define therebetween a V-shaped groove 26 in the central plane of the armature body 27. A forward end 28 of armature body 27 includes an opening 30 or other suitable means for attaching the armature to an external utilization device for performing work on the latter.

Armature 20 is mounted within a frame assembly 32 for lineal movement in the armature plane. Frame assembly 32 comprises a pair of identical frame segments or sections 34,36 of magnetically permeable material. Each frame segment 34,36 includes a flat base 38 having a pair of laterally spaced parallel side flanges 40,42 projecting orthogonally therefrom. The inside free edge of each side flange 40,42 is uniformly beveled as at 44,46 along the entire length of frame sections 34,36. Externally, each side flange 40,42 terminates in a reverse lip 48,50. In assembly, frame sections 34,36 are mounted with flanges 40,42 in opposed abutment and captured by the removable spring clips 52 received over lips 48,50. Opposing beveled surfaces 44,46 cooperate in assembly internally of frame 32 to define a pair of opposing generally V-shaped channels or grooves indicated at 54.

Two longitudinally spaced pairs of pins 58,60 are press fitted into corresponding openings in armature body 27 and project outwardly therefrom into armature side grooves 26. Likewise, two longitudinally spaced pairs of pins 57,59 are received in corresponding openings between opposing frame flanges 40,42 at the parting line thereof and project inwardly therefrom into frame groove 54. A plurality of ball bearing elements 56 are captured within opposing grooves 26,54, one between each of the opposing pairs of pins 57,58 or 59,60. Thus, armature 20 is carried by ball bearing elements 56 for planar movement between an outer position (solid lines in FIG. 1) defined by abutment of opposing stator and armature pins through a corresponding ball element, and an inner position (partially shown in phantom in FIG. 1) defined by ball/pin abutment in the opposite direction. Pins 57-60 thus not only cooperate to define limits of armature travel, but also retain the ball bearing elements within the opposing slots.

An electromagnetic stator 62 is fixedly carried by frame assembly 32 for moving armature 20 with respect thereto. Stator 62 includes first and second stator portions 63,64 spaced longitudinally from each other in the direction of armature motion and acting essentially in opposition to each other variably to position armature 20 at or between its limits of travel in a manner to be described. Stator portion 63 includes stator segments 65,66 respectively carried by frame segments 34,36 in opposition across the plane of armature 20. Likewise, stator portion 64 includes stator segments 67,68 respectively carried by frame segments 34,36 in opposition across armature 20. With the exception of position and orientation with respect to armature 20, all stator segments 65-68 are identical. Segment 65 will be described in detail.

Stator segment 65 includes a laterally spaced array of longitudinally extending rectangular pole pieces 69,70,72,74,76 integrally and perpendicularly projecting from the plane of frame wall 38. Pole pieces 69-76 terminate within frame assembly 32 in corresponding flat pole faces on a common plane spaced in assembly by an air gap from armature body 27. The corresponding pole pieces 69-76 for all stator segments 65-68 are coplanar. A stator coil 78 is wound around pole pieces 68. Coil 78 comprises a strip of insulated conductive ribbon stock, preferably copper, coiled on edge and then placed as a sub-assembly over pole pieces 69. A pair of conductive pins 80,82 are soldered to the inner and outer ends of coil 78, preferably at one longitudinal end thereof, for connection to a source of electric power as will be described. Stator coils 84,86, each identical to coil 78, are located over pole pieces 72,76. All coils 78,84,86 are wound in the same direction, and the coil laminae effectively fill the lateral spaces between successive pole pieces 69-76.

A pair of circuit boards 90,92 are respectively carried by frame segments 34,36 in the plane of base 38 and between corresponding longitudinally spaced stator portions 63,64. Each board 90,92 is constructed of the usual insulating material, and has suitable openings received over all pins 80,82 of the stator coils for the corresponding frame segment. Suitable conductors on each board 90,92 connect outer pin 82 of each coil 78,84 to the inner pin 80 of the next coil 84,86. The outer pin 82 of each coil 86 and the inner pin 80 of each coil 78 are connected to a corresponding tab 94,96 for connection to external circuitry. Thus, coils 78,84,86 in each stator segment 65,66, 67,68 are connected in series.

In operation, the stator segments are preferably connected in pairs 65,66 and 67,68 to a source of external energizing power (not shown) so that the coils and pole pieces facing each other across armature 20 are of identical magnetic polarity. That is, assuming that coils 78,84,86 of frame segment 34 are connected such that pole pieces 69,72 and 76 are of "north" polarity and pole pieces 70,74 are of "south" polarity for current in a given direction, the coils 78,84,86 of frame segment 36 are likewise connected so that the opposing pole pieces are of the same polarity for such current direction. The flux path for each coil thus tends to be between adjacent poles (through the armature body) rather than across the armature body to the opposing pole. Referring in particular to FIG. 3, it will be noted that armature body 27 "covers" only a portion of the opposing stator poles, specifically a longitudinal distance substantially equal to the distance between about the forward pole corners in each stator portion 63,64. It will thus be evident that the position of armature 20 covering the pole pieces will vary as a function of relative magnetic attraction to stator portions 63,64, which in turn is a direct function of current through the coils of the respective stator portions.

FIGS. 5-8 illustrate a variable axis linear actuator 100 which is similar in many respects to the actuator of FIGS. 1-4. Elements identical in structure and function to those previously described are identified by correspondingly identical reference numerals. Only the differences between actuator 100 (FIGS. 5-8) and actuator 18 (FIGS. 1-4) will be described.

The ball-carrying channels 102 in actuator 100 are not continuous lineally of frame 104 as in the embodiment of FIGS. 1-4, but are segmented, with each segment equally angulated with respect to the parting plane of the identical frame segments 103,105 and the plane of armature 106. Thus, armature 106 is carried for compound movement both longitudinally and perpendicularly of the armature plane. It will be appreciated that the longitudinally spaced ends of frame channels 102 serve the function of pins 57,59 in the embodiment of FIGS. 1-4.

Stator 110 in the embodiment of FIGS. 5-8 comprises oppositely-acting stator segments 112,114 disposed on respective sides of armature 106. The pole pieces 116 integrally depending from frame segment 104 are offset laterally from the identical pole pieces 118 of the opposing frame segment 105, which is to say that the pole pieces of each frame segment are oppositely laterally offset with respect to the center line of the identical frame segments. The several stator coils 120,122, which extend longitudinally throughout the frame segments 104,105 respectively, are connected by pins 80,82 to respective circuit boards 126,128 mounted at the rearward ends of frame segments 104,105 in the plane of the frame segment bases. All coils 120,122 of each stator segment 112,114 are connected in series. Tabs 130 project laterally from boards 126,128 for connecting stator segments 112,114 to be energized alternatively by external means (not shown). Armature 106 is drawn upwardly and inwardly when stator segment 112 is energized, and downwardly and outwardly (phantom in FIG. 6) when stator segment 114 is energized.

FIGS. 9-11 illustrate a rotary actuator 104 which embodies basic principles of the invention. A plane circular armature 142 is rotatably coupled to a central shaft 144 by a woodruff key 146. A pair of orthogonal flanges 150,152 extend entirely around armature 142 and define an armature groove or channel 154 in the armature plane. A pair of frame sections 156,158 are mounted in opposed relation by the annular clamp 160. Frame segments 156,158 have the respective opposing peripheral flanges 161,162 which cooperate to form the arcuately segmented channels 164 in the frame assembly. Channels 164 are at an angle with respect to the plane of armature 142. A ball bearing element 166 is captured within each segmented channel 164 by the armature channel 154 and cooperates with pins 168 projecting from armature 142 to mount armature 142 for limited rotation as previously described.

Each frame segment 156,158 includes a plurality of concentric, radially spaced, annular pole pieces. The radial position of and distance between the annular pole pieces 170,172, 174,176 of frame segment 156 and pole pieces 171,173,175,177 of frame segment 158 are such that the opposed pole pieces are laterally—i.e. radially—offset from each other. Specifically, each pole piece of one stator frame segment is positioned midway between adjacent pole pieces of the opposing segment.

This structural feature (which is also embodied in FIGS. 5-8) avoids magnetic stiction.

A plurality of annular stator coils are effectively wound around the pole pieces by winding a continuous length of ribbon stock in opposite directions between successive pole pieces. More specifically, referring to FIG. 10 in particular, a continuous length of ribbon stock 177 is wound counterclockwise from adjacent inner pole 171 to and through a gap 178 in pole 173, then clockwise out to and through a gap 180 in pole 175, and then counterclockwise to a gap 182 in pole 177. A pin 184 is disposed in a gap 186 in inner pole 171, and a second pin 188 is disposed in outer pole gap 182. Pins 184,188 are suitably connected to the inner and outer ends of the coiled ribbon stock. It will be appreciated, of course, that the stator coil in the embodiment of FIGS. 9-11, as with the previous embodiments, preferably is prewound around a suitable fixture and inserted as a subassembly with pins 184,188 attached into frame segment 156.

Thus, armature 142 is mounted by balls 166 and segmented grooves 164 for compound movement with respect to the frame assembly—i.e. rotationally about the axis of shaft 144 and axially of the shaft and armature axes. FIG. 11 illustrates a modification wherein the axial walls of the segmented grooves 164 are contoured to give high starting torque at the beginning of each stroke. FIG. 9 shows two rotary actuators 140 "stacked" onto output shaft 144 for extra power. A multiplicity of actuators 144 may be so "stacked" where desired. In such applications, ball bearing elements 166 need only be included in the end actuators of the stack.

There have thus far been disclosed three preferred embodiments of the invention: a fixed axis variable position linear solenoid actuator (FIGS. 1-4), a variable axis linear actuator (FIGS. 5-8) and a fixed axis rotary actuator (FIGS. 9-11). Each of these actuators embodies basic features of the invention. In each case, a planar armature is supported for movement within a frame by ball bearing elements disposed along the sides or edges of the actuator. These ball bearing elements are disposed in complementary or opposing grooves in the armature and frame, and are captured therein by pins carried by the armature which also serve to limit motion of the actuator with reference to the frame. This armature support arrangement is economical and reliable and may be readily repaired if required.

In the embodiments of FIGS. 1-8, the armature-supporting frame comprises a pair of identical frame sections mounted in opposing relation. Each frame section includes half of the required frame bearing groove or channel, so that the armature is mounted at about the parting plane of the frame sections. Provision of identical frame sections not only reduces costs and inventory requirements, but also materially enhances repair and assembly time.

In accordance with yet another important feature of each embodiment thus far disclosed, the actuator stator is constructed not only to reduce material cost and requirements, but also to cooperate with the planar armature to provide a more fast-acting and efficient actuator as compared with typical prior art devices. In each embodiment, the actuator stator comprises a number of coils of ribbon stock effectively wound around pole pieces integrally upstanding from each frame segment. In the case of the linear actuator embodiments (FIGS. 1-8), individual coils are disposed around alternate pole pieces and are connected in series so that alternate pole pieces exhibit opposite magnetic polarities when the coils are connected to a source of electric power. The use of copper ribbon stock provides improved ampere-turn/copper-mass efficiency as compared with wire-wound coils typical of the prior art.

In each disclosed embodiment, oppositely-acting stator assemblies are provided, on opposing frame sections in FIGS. 5-11 and longitudinally spaced on the same frame segments in FIGS. 1-4, for operating on the armatures in opposite directions. It will be recognized in each case that one stator may be replaced by a suitable return spring.

FIG. 12 illustrates a variable axis linear solenoid actuator 200 which is a modification to that illustrated in FIG. 7 and described hereinabove. Reference numerals in FIG. 12 which are identical to those used in connection with FIG. 7 illustrate identical parts. Actuator 200 includes opposed identical frame segments 202,204 of magnetic material which form a stator assembly 206. A plurality of laterally spaced longitudinally extending pole pieces 208,210 integrally project from the bases of respective frame segments 202,204. Pole pieces 208,210 are laterally offset with respect to the centerline of stator assembly 206 and with respect to each other so that each pole 200 is positioned midway between an opposing pair of adjacent poles 210, and vice versa. Ribbon coils 120,122 encompass alternate pole pieces 208,210 respectively. (See FIG. 5.) Each pole piece 208,210 projects inwardly from associated coils 120,122 and terminates in an edge which is generally V-shaped in lateral cross section having laterally oriented side faces 209,211 at an acute angle to each other.

The armature 212 of solenoid actuator 200 comprises a pair of juxtaposed plates 214,216 which are fastened to each other at their lateral edges, with each plate terminating at one edge in a pair of orthogonal flanges 22,24 which form the armature bearing-receiving channels or grooves 26. Each plate 214,216 has a plurality of laterally spaced longitudinally extending and longitudinally continuous V-shaped channels or undulations 218 formed therein. The undulations 218 of plate 214 alternate with and are nested within the undulations 218 of plate 216, and vice versa. The undulations 218 of plate 214 extend into the space between adjacent poles 208 of frame segment 202, while the undulations 218 of plate 216 extend between poles 210 of segment 204. The angle between the undulations 218 which embrace each pole piece 208,210 is equal to the angle between pole faces 209,211 so that the armature undulation surfaces are parallel to the opposing pole piece side faces. Plates 214,216 are spaced from each other in the region between pole pieces 208,210.

FIGS. 13 and 14 illustrate a linear solenoid actuator 220 which embodies the undulating armature concept of FIG. 12. The armature 220 of FIGS. 13 and 14 comprises a pair of axially spaced circular plates 222,224 having radially spaced concentric annular internested V-shaped undulations 223, 225 formed therein. Plates 222,224 are spaced from each other except where connected to the actuator output shaft 226. The stator assembly 228 comprises axially opposed stator segments 230,232, each of which has a plurality of axially extending radially spaced annular poles 231,233 projecting therefrom. The poles 231 of stator segment 230 are laterally offset—i.e. radially offset—from the poles 233 of stator segment 232. Each stator pole 231,233 terminates in laterally facing—i.e. radially inwardly and outwardly facing—angulated side faces on associated cones of revolution, each pole edge thus being V-shaped in cross section as shown in FIG. 13. The internested undulations 223,225 of armature plates 222,224 extend between adjacent pairs of poles on the opposing stator frame segment. As was the case in FIG. 12, the side faces of the armature undulations, in this case conical, are parallel to the side pole piece side faces. Output shaft 226 is slidably received within a non-magnetic housing 227 which encloses the stator segments and maintains their axially spaced relationship.

FIG. 15 illustrates the advantage of the undulating armature concept of FIGS. 12–14. In FIG. 15, the curve 234 illustrates the force-versus-stroke characteristic of the actuator 219 in FIGS. 13–14, while the curve 236 illustrates the force-versus-stroke characteristic of a similar solenoid embodying a flat—i.e. planar—armature. It will be noted that the curve 234 exhibits a peak force at the end of the stroke (zero air gap), following a substantially uniform force-versus-stroke characteristic. This output characteristic is considered to be highly desirable. Total power is relatively uniformly distributed throughout the stroke. By contrast, the curve 236 exhibits a very high force at the end of the stroke, which may be desirable, following a very low force-versus-stroke function. Most of the power is dissipated at the end of the stroke. The curve 238 in FIG. 15 illustrates the output of the prior art actuator disclosed in U.S. Pat. No. 4,097,833, which exhibits a desirably flat force-versus-stroke function in the intermediate portion of the stroke, but undesirably falls at the end of the stroke.

It will be appreciated that all of the solenoid actuators herein disclosed in connection with FIGS. 5–14 (and 16) are so-called variable air gap actuators, wherein the distance across the stator-armature air gap varies as a direct function of the stroke. The embodiments of FIGS. 12–14 have the advantage of reducing the variation of air gap with stroke, and thus obtain the desirable result illustrated in FIG. 15. Thus, for a linear actuator of the type illustrated in FIG. 13 having a flat armature, air gap and stroke vary on a 1:1 ratio. However, for the actuator 219 of FIG. 13 (and the actuator 200 of FIG. 12), the stroke/air-gap ratio varies with angle of the complementary opposing armature and pole piece faces. For example, in the embodiment of FIGS. 13–14, the stroke/air-gap ratio is 2:1 where such angle is 60° with respect to the solenoid axis, 2.85:1 for an angle of 45°, 3.75:1 for an angle of 30° and 5.5:1 for an angle of 20°, which is shown in the drawings.

FIG. 16 illustrates a linear actuator 240 which comprises a pair of axially spaced circular armature plates 242,244 affixed to the output shaft 246 and respectively disposed so as to cooperate with an associated stator segment 248,250. Each stator segment 248,250, which are identical, includes a radially spaced array of axially extending annular poles. Annular V-shaped undulations of armature plates 242,244 project between adjacent pairs of stator poles. Each stator segment 248,250 has a spirally wound ribbon coil 252 mounted thereon, each such coil being formed in a manner analogous to that hereinabove described in connection with FIG. 10. Output shaft 246 is slidably mounted in a non-magnetic housing 247 which encloses stator segments 248,250. When the coil 252 of stator segment 248 and/or 250 is energized, the armature plate 242 and/or 244 are drawn thereagainst so as to move the output shaft 246 toward the left in FIG. 16 between the positions illustrated in phantom and solid lines. When the stator segments are de-energized, the shaft moves to the right under control of a return spring (not shown).

FIG. 17 illustrates a modification to the embodiment of FIGS. 1–4 wherein the armature-carrying ball bearings are replaced by magnetic bearings 260. Each magnetic bearing 260 includes a channel-shaped stationary segment 262 captured between the flanges 40,42 of the stator frame segments 36,34. The magnets 262 which may be of suitable ceramic construction, for example, are magnetized so that each wing or flange thereof is of opposite polarity, with the magnetic lines of flux extending perpendicularly therefrom. A plurality of magnetic elements 264 are mounted by swivel ball bearings 266 to armature 20, one in place of each ball bearing element 56 illustrated in FIGS. 1–4. Each magnet 264 is received within the channel formed by an opposing magnet 262, with opposed planar faces of identical polarity, so that magnets 264 and armature 20 are slidably suspended by magnetic force within stationary magnets 262. The swivel bearings 266 accommodate minor misalignment between the armature and stationary bearing elements. Stop pins 59,60 (FIGS. 1–4) are provided, but are not illustrated in FIG. 17.

FIG. 18 illustrates a modification to the embodiment of FIGS. 1–4 wherein the four ball bearing elements which are captured between opposed grooves on the stator and armature in FIGS. 1–4 are replaced by a multiplicity of bearings disposed to circulate in a continuous path which includes the ball races 270 carried externally of the stator frame assembly 32. This modification is provided to accommodate extremely long armature strokes, as on the order of 2 inches (5 centimeters) or more.

A modification to the embodiment of FIGS. 13–14, which is illustrated in FIG. 19, contemplates replacement of the annular stator poles and armature undulations with circumferentially spaced radially extending complementary poles 280 on stator 282 and undulations 284 on armature 286. In such a modification, the angulated pole and armature surfaces would be planar and would face each other in the circumferential direction. The invention thus contemplates parallel (FIGS. 1–8 and 12), concentric (FIGS. 11, 13–14 and 16) and radial (FIG. 9) armature/stator structures.

The invention claimed is:

1. A solenoid actuator comprising a ferromagnetic armature having an edge, means including a frame mounting said armature for movement through a defined path having a component of movement perpendicular to said edge, and a stator carried by said frame and oriented with respect to said armature to be electromagnetically coupled to said armature for drawing said armature in the direction of said component on said path, said stator comprising at least one pole piece of ferromagnetic construction oriented in the direction of said component, an electrical coil comprising a plurality of laminations of conductive ribbon material spirally coiled on edge in a plane around said at least one pole such that the soil edge plane is perpendicular to said movement component of said armature, and means for connecting said coil to a source of electrical power.

2. The solenoid actuator set forth in claim 1 wherein said stator comprises a plurality of said pole pieces disposed in a uniformly spaced array and integrally connected by a flat base, and a plurality of said coils disposed about said pole pieces and coiled in opposite directions between alternate pairs of said pole pieces such that said edge planes of said coils are coplanar and abut said base.

3. The solenoid actuator set forth in claim 2 wherein said pole pieces comprise concentric annular poles, and wherein said plurality of coils comprises a continuous length of ribbon stock alternately coiled in opposite directions between successive ones of said pole pieces, there being spaces in said poles through which said ribbon extends between coils.

4. A solenoid actuator ferromagnetic armature means having an edge; means mounting said armature means for movement through a defined path at least a component of which is perpendicular to said edge; and first and second electromagnetic stator segments carried on opposite sides of said armature means, said first and second stator segments each comprising a generally cup-shaped stator body of ferromagnetic construction having a flat base and a plurality of stator poles integrally orthogonally projecting from said base in a uniformly spaced array, said segments being carried with respect to said armature-mounting means such that said bases of said stator bodies are parallel to each other and positioned on opposite sides of said armature, and such that said poles project from said bases toward each other in directions parallel to said component of armature movement, electrical coil means positioned on said base of each said stator body and including a plurality of interconnected ampere-turn segments extending in one direction between adjacent said poles and in opposite directions between adjacent pairs of said poles, said electrical coil means being adapted for connection to a source of electrical power for energizing the corresponding said stator segment such that adjacent ones of said poles in each said stator assembly are of opposite magnetic polarity upon energization of said stator assemblies.

5. The solenoid actuator set forth in claim 4 wherein said electrical coil means comprises a plurality of laminations of conductive ribbon material coiled on edge in a plane between said poles.

6. The solenoid actuator set forth in claim 4 wherein the said poles of each said stator segment are positioned between a corresponding pair of poles of the opposing said stator segment across said armature means.

7. The solenoid actuator set forth in claim 4 wherein the said poles of each said stator segment are offset laterally of said planar edge from the poles of the opposing said segment across said armature.

8. The solenoid actuator set forth in claim 7 wherein each said pole of one said stator segment is disposed midway between poles of the opposing said stator segment across said armature.

9. The solenoid actuator set forth in claim 8 wherein said armature means comprises a plate of flat planar construction.

10. The solenoid actuator set forth in claim 8 wherein said armature means comprises a plate having a plurality of continuous undulations, one said undulation being disposed between an adjacent pair of poles on each said stator segment.

11. The solenoid actuator set forth in claim 10 wherein said armature means comprises a pair of juxtaposed plates each having continuous undulations, the said undulations of one plate alternating with and nesting within the said undulations of the other said plate, each undulation of each said plate being disposed between a corresponding pair of poles on the adjacent said stator segment, said plates including said nested undulations being spaced from each other between said stator segments.

12. The solenoid actuator set forth in claim 11 wherein said undulations are V-shaped in cross section having sides at alternating angles, and wherein the edge of each said pole is contoured to complement the said sides of the adjacent said convolutions.

13. A solenoid actuator comprising ferromagnetic armature means including a flat plate having a symmetrical array of Continuous undulations extending therealong, means including a frame mounting said armature means for movement through a defined path at least a component of which is perpendicular to said plate, a first electromagnetic stator segment carried by said frame and including a generally cup-shaped stator body of ferromagnetic construction having a flat base parallel to said flat plate and a plurality of continuous stator poles integrally orthogonally projecting from said base in a uniformly spaced a array parallel to said component of armature movement, each said armature undulation being disposed and extending between an adjacent pair of said poles, and electrical coil means positioned on said base of said stator body surrounding said poles and including a plurality of interconnected ampere-turn segments extending in one direction between adjacent said poles and in opposite directions between adjacent pairs of said poles, said electrical coil means being adapted for connection to a source of electrical power for energizing said stator assembly such that adjacent pairs of said poles are of opposite magnetic polarity.

14. The solenoid actuator set forth in claim 13 wherein said undulations are all of identical V-shaped cross section, the opposing sides of said V-shaped cross section being at opposite angles to said plate, and wherein each said pole has an edge which is V-shaped in cross section disposed between adjacent armature undulations, said v-shaped cross sections of said poles and said undulations, said V-shaped cross sections of said poles and said undulations being of identical included angle.

15. The solenoid actuator set forth in claim 14 wherein said poles and said undulations are of concentric annular construction.

16. The solenoid actuator set forth in claim 14 wherein said poles and said undulations are of parallel linear construction.

17. The solenoid actuator set forth in claim 14 further comprising a second electromagnetic stator segment carried by said frame in opposition to said first stator segment, with said armature means being disposed between said opposed first and second stator segments, and wherein said armature means comprises a pair of juxtaposed plates having alternating internested undulations, each of which is disposed between an adjacent pair of poles in the opposing said stator segment, said plates including said undulations being spaced from each other between said stator segments.

18. A solenoid actuator comprising an armature having a planar edge and first channel means extending along at least a portion of said edge and opening outwardly of said armature, first and second electromagnetic stator assemblies including means mounting said first and second stator assemblies parallel to and on opposite sides of the plane of said armature edge, said stator-mounting means including first and second segments each having a base carrying a corresponding said stator assembly and flange means extending from said base with means forming second channel means opposed to said first channel means, each said flange means including a corresponding half-segment of said second channel means, means mounting said first and second segments with said flange means in opposed abutment and said half-segments in registry to define said second channel means, and a plurality of ball bearing means captured between and within said opposed first and second channel means and supporting said armature for movement with respect to said first and second stator assemblies.

19. The solenoid actuator forth in claim 18 wherein each said stator assembly comprises a plurality of stator poles integrally upstanding from the corresponding said base, and electrical coil means surrounding at least one said stator pole on each said base and adapted for connection to a source of electric power for energizing the corresponding said stator assembly.

20. The solenoid actuator set forth in claim 19 wherein said electrical coil means comprises a plurality of interconnected ampere-turn segments extending in one direction between adjacent said poles and in opposite directions between adjacent pairs of said poles, such that adjacent ones of said poles are of opposite magnetic polarity upon energizing of said stator assemblies.

21. The solenoid actuator set forth in claim 20 wherein said electrical coil means comprises a plurality of laminations of conductive ribbon material coiled on edge between said poles.

22. The actuator set forth in claim 18 wherein said armature has laterally opposed lineal side edges, said first channel means comprising first and second laterally outwardly directed channels extending lineally along a corresponding said side edge in a direction parallel to the plane of said armature edge.

23. The actuator set forth in claim 22 wherein said second channel means comprises third and fourth laterally inwardly directed channels extending linearly along said frame in a direction parallel to the plane of said armature edge, such that said armature is carried by said bearing means for lineal movement in the plane of said armature edge in the direction of said channels.

24. The actuator set forth in claim 23 wherein each of said first and second stator assemblies comprises a pair of stator means spaced from each other in the direction of movement of said armature, and wherein the dimension of said armature in the direction of armature movement is less than the total dimension of said first and second stator assemblies, said armature being adapted to be controllably positioned within said frame as a conjoint function of current through the stator means of each said pair.

25. The actuator set forth in claim 24 wherein all of said channels are lineally continuous, and wherein said actuator further comprises means projecting into said channels for limiting movement of said armature in the direction of said channels.

26. The actuator set forth in claim 22 wherein said second channel means comprises third and fourth laterally inwardly directed channels extending at an angle with respect to the plane of said armature edge, such that said armature is carried by said bearing means for compound movement in the direction of the plane of said armature edge at an angle with respect to said plane parallel to said third and fourth channels.

27. The actuator set forth in claim 18 wherein said armature is circular, having a continuous circular edge, and wherein said first channel means extends circumferentially around at least a segment of said circular edge, such that said armature is carried by said bearing means for rotary movement about the axis of said armature and said edge.

28. The actuator set forth in claim 27 wherein said second channel means comprises an array of arcuate channel segments distributed around said axis, with each said channel segment being disposed at an angle with respect to the plane of said armature edge, such that said armature is carried by said bearing means for compound movement rotationally about said axis and lineally in the direction of said axis.

29. The actuator set forth in claim 28 further comprising means carried by said armature and cooperating with said channel segments and said bearing means for limiting movement of said armature rotationally about said axis and in the direction of said axis.

30. A solenoid actuator comprising a stator having a flat circular base of ferromagnetic construction with a central axis and a plurality of radially spaced concentric circumferential stator poles integrally extending axially from said base to terminate in a plurality of pole edges on a common plane parallel to said base; electrical coil means carried by said stator between said poles adjacent to said base, said electrical coil means including a plurality of interconnected ampere-turn segments extending in one direction between adjacent said poles and in opposite directions between adjacent pairs of said poles; an armature including a generally flat plate of ferromagnetic construction parallel to said base and spaced from said pole edges; and means mounting said armature for linear motion with respect to said stator in the direction of said axis.

31. The solenoid actuator set forth in claim 30 wherein said electrical coil means comprises a continuous length of ribbon stock spirally coiled on edge in a plane parallel to said base and extending in opposite directions between successive ones of said poles, there being spaced in said stator poles through which said ribbon extends.

32. The solenoid actuator set forth in claim 31 wherein said armature comprises a circular disc.

33. The solenoid actuator set forth in claim 32 wherein said armature disc has a plurality of annular projections integrally extending therefrom, one said projection being radially positioned between adjacent pairs of said poles.

34. A solenoid actuator comprising a stator which includes a cup-shaped one-piece ferromagnetic stator body having a flat base with a central axis and a plurality of spaced poles integrally extending axially from said base to pole edges on a common plane parallel to said base, electrical coil means carried by said stator between said poles adjacent to said base, said coil means comprising a continuous length of ribbon stock spirally coiled perpendicularly of said axis, an armature including a one-piece ferromagnetic plate parallel to said base and spaced from said pole edges, and means mounting said armature for motion with respect to said stator, at least one component of said motion being in the direction of said axis.

35. The solenoid actuator set forth in claim 34 wherein said armature plate has a plurality of integral projections extending therefrom, one said projection being positioned between adjacent pairs of said poles.

36. A solenoid actuator comprising armature means including a plate having a symmetrical array of continuous undulations extending theralong, means including a frame mounting said armature means for movement through a defined path at least a component of which is perpendicular to said plate, a first electromagnetic stator segment carried by said frame and including a plurality of continuous stator poles, with each said armature undulation being disposed and extending between an adjacent pair of said poles, and electrical coil means surrounding said poles and adapted for connection to a source of electrical power for energizing said stator assembly such that adjacent pairs of said poles are of opposite magnetic polarity, said undulations all being of identical V-shaped cross section, the opposing sides of said V-shaped cross section being at opposite angles to said plate, each said pole having an edge which is V-shaped in cross section disposed between adjacent armature undulations, said V-shaped cross section of said poles and said undulations being of identical included angle, said poles and said undulations being of concentric annular construction.

37. A solenoid actuator comprising armature means including a pair of juxtaposed plates having symmetrical arrays of alternating interested continuous undulations extending therealong, means including a frame mounting said armature means for movement through a defined path at least a component of which is perpendicular to said plates, a first electromagnetic stator segment carried by said frame and including a plurality of continuous stator poles, a second electromagnetic stator segment carried by said frame in opposition to said first stator segment, with said armature means being disposed between said opposed first and second stator segments and with each said undulation disposed and extending between an adjacent pair of poles in the opposing said stator segment, said plates including said undulations being spaced from each other between said stator segments, and electrical coil means surrounding said poles and adapted for connection to a source of electrical power for energizing said stator assembly such that adjacent pairs of said poles are of opposite magnetic polarity, said undulations all being of identical V-shaped cross section, the opposing sides of said V-shaped cross section being at opposite angles to the associated said plate, each said pole having an edge which is v-shaped in cross section disposed between adjacent armature undulations, said V-shaped cross sections of said poles and said undulations being of identical included angle.

* * * * *